Jan. 16, 1962 C. W. BROWNING 3,016,988
LIFTING DEVICE
Filed Oct. 19, 1959 2 Sheets-Sheet 1

Inventor.
Charles W. Browning
By Wilson & Pepper
Attorneys.

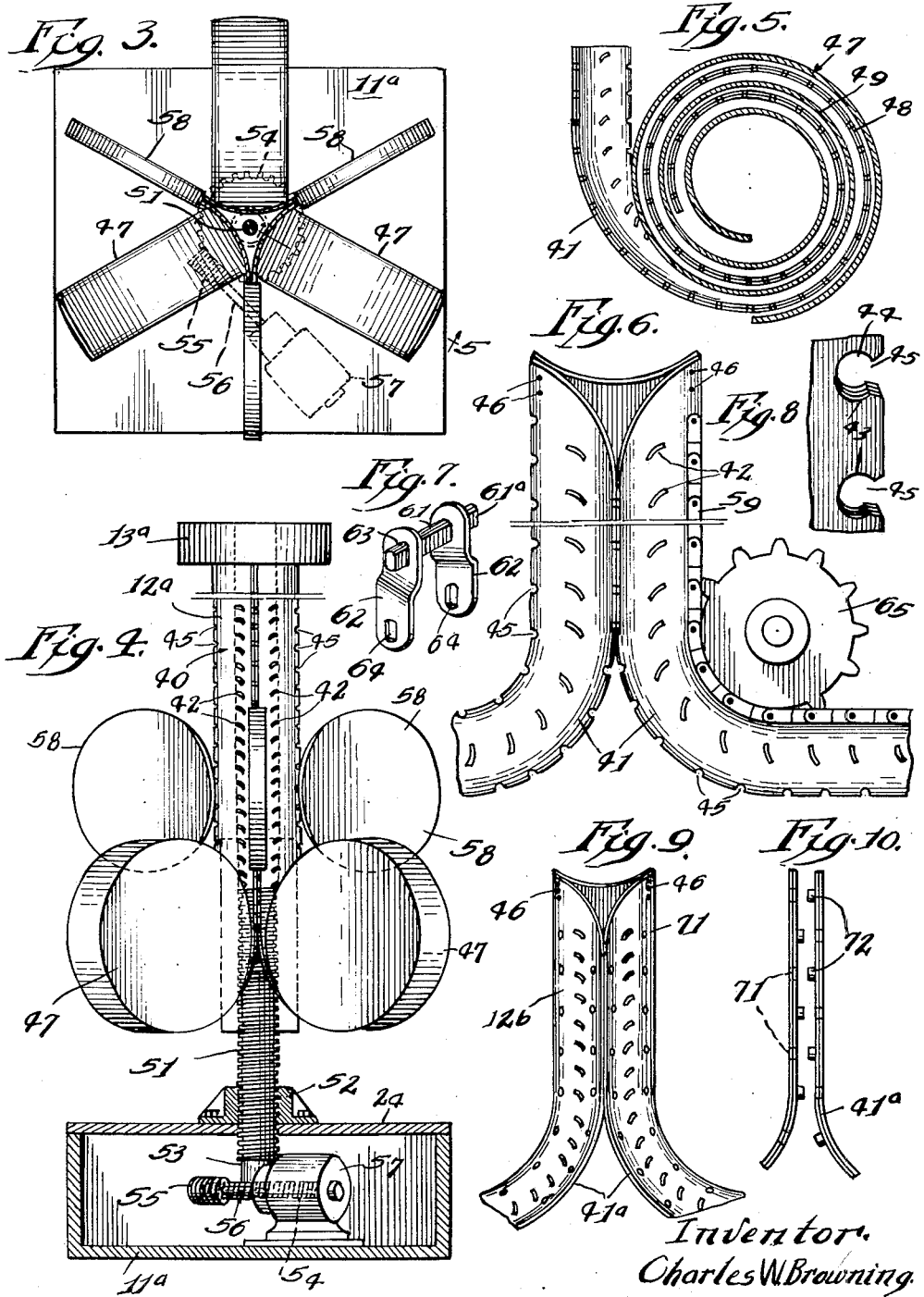

United States Patent Office 3,016,988
Patented Jan. 16, 1962

3,016,988
LIFTING DEVICE
Charles W. Browning, 3032 N. Garrison, Tulsa, Okla.
Filed Oct. 19, 1959, Ser. No. 847,175
9 Claims. (Cl. 187—17)

The present invention relates to a new and novel lifting device as described in the following specification.

Lifting devices have many uses including that of a lifting jack having a platform for most effectively elevating and lowering a relatively heavy load. The main difficulty with prior lifting devices is that generally they are complicated and easily disabled. The present invention, however, relates to a simple lifting mechanism adaptable to many conditions and uses where positive control of a lifting platform is required.

An important object of the present invention is to provide a lifting device employing novel extendable standards for supporting a platform, said standards comprising the use of plural metal strips which are formed to have a transverse concavo-convex surface. These strips are quite stiff in compression with regard to any bending where the inside angle of the bend is on the convex side of the strip. However, the strip is easily bent where the inside angle is on the concave side of the strip.

Another important object is the provision of a lifting device utilizing standards each comprising a plurality of metal strips having transverse concave curves with the strips of each standard arranged in abutting and reinforcing relation and with certain standards arranged in opposition to each other. Thus the bending of any one standard will be counteracted by the stiffness of another standard acting in opposition to the first one. This provides for a rigid assembly of standards combining to maintain the supported platform in a horizontal position as it is lifted, lowered or held in any desired position.

A further object of the invention is the provision of a rigid platform supported at the top edges of the plural lifting standards. The strips are preferably joined to the platform with the latter provided with depending sides adding rigidity to the structure involved.

Another object of the present invention is the provision of a novel lifting device having a wide base and a wide platform with opposed laminated metal standards arranged at opposite sides of the platform. The wide base contains the driving or raising and lowering mechanism which feeds the metal standards through guides in the top of the base. The laminated standards are anchored in the rigid platform forming with the base a strong yet lightweight structure which has a maximum of stability and resistance to any bending or distortion of the metal standards or uprights. Further, the rigid platform and multiple standards arranged in the manner disclosed form a rigid assembly with the curved standards on one side reinforcing and bracing those on the other side whereby heavy objects may be quickly and easily lifted, retained or lowered, as required.

Another object of the invention is the provision of laminated standards for a lifting device, said standards composed of plural curved but relatively thin metal strips arranged in abutting relation and giving increased strength and rigidity to the lifting standards.

Another object is the provision of a lifting device having plural standards each consisting of multiple curved metal strips with the standards arranged in edge-abutting relation and the longitudinal edges engaged in a novel manner to provide a rigid, substantially tubular supporting structure. The standards may be self-locking having the locking means integral with the strips, or the locking members may be supplementary to the strips with feeding means synchronized with the feeding means extending and retracting the curved strips of each standard.

The present invention further comprehends a novel means and manner of coiling and housing the portions of the extensible and retractable laminated metal standards within the base, and for simultaneously feeding these standards from the base or retracting them into the base, as required.

Further objects are the provision of a lifting tool which is light in weight, economical to operate and simplified in construction, and such other features as will appear from and be inherent in the structure described in the specification and shown in the drawings.

In the drawings:

FIG. 3 is a top plan view of a second embodiment of the lifting device.

FIG. 4 is a side elevational view of the embodiment of FIG. 3 but with the base in vertical cross section to disclose the driving means.

FIG. 5 is a vertical cross-sectional view of a storage chamber for one of the laminted standards and into which the standard is retracted or extended.

FIG. 6 is an enlarged fragmentary perspective view of the three laminated supporting standards of FIGS. 3, 4 and 5 joined together in extended position by connecting their adjoining edges by means of a chain locking means whereby to form a rigid vertical support for a platform.

FIG. 7 is an enlarged perspective view of a link in the locking chain used in the embodiment shown in FIG. 6.

FIG. 8 is an enlarged fragmentary view of one of the slotted edges of a laminated metal standard of FIG. 6.

FIG. 9 is a fragmentary perspective view of a tubular support similar to that of FIG. 6 but with the edges of adjoining standards provided with interlocking means.

FIG. 10 is a fragmentary view of the edges of the adjoining laminated standards of FIG. 9 separated to show in detail the integral locking means.

Figure 1:
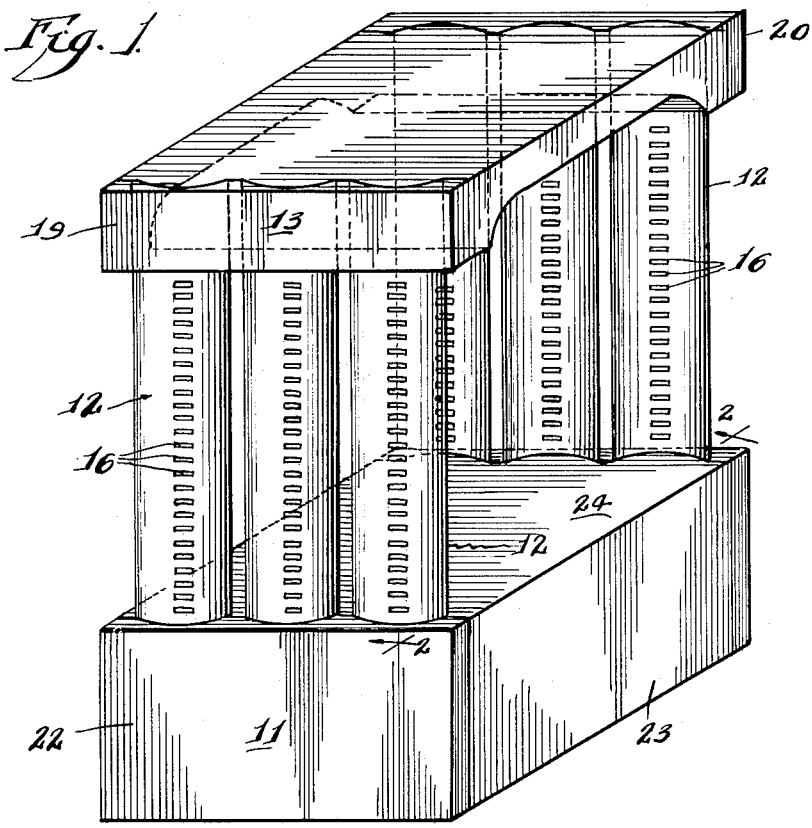
FIGURE 1 is a perspective view of one embodiment of the novel lifting device as contemplated in this invention including a base, lifting standards and rigid platform, the latter being shown in an intermediate elevated position.
Figure 2:
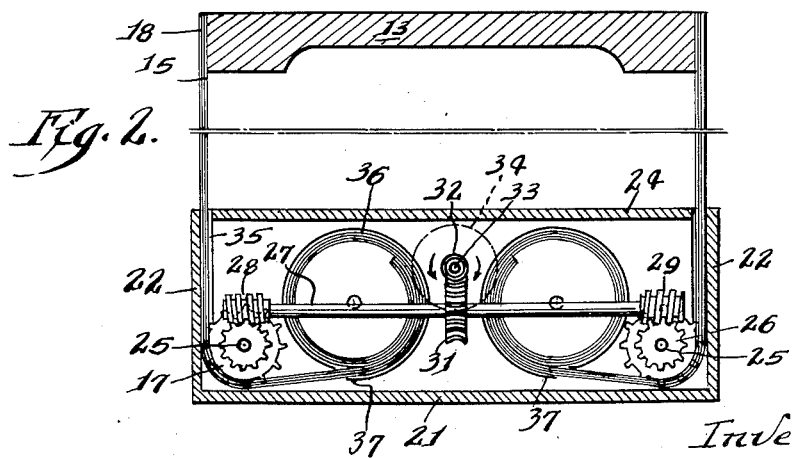
FIG. 2 is a vertical cross-sectional view of the lifting device taken substantially on line 2—2 of FIG. 1 and looking in the direction of the arrows.

Referring to the disclosure in the drawings in which are shown illustrative embodiments of the present invention, FIGS. 1 and 2 disclose a preferred embodiment of the novel lifting device which includes a relatively wide and deep base 11, lifting standards 12 and a rigid top platform 13 capable of supporting, raising and lowering a relatively heavy load. The base and platform are of sufficient depth as to provide accurate guiding means for the lifting standards and to afford the desired rigidity to the assembly.

Each standard 12 is composed of two or more metal strips 15 of concavo-convex shape with the strips arranged to form a laminar structure. The number of strips or laminations employed preferably depends upon the use and loads intended to be lifted. The concave curve of each strip faces inwardly towards the center of the base 11. Each strip is formed with a plurality of transverse slots 16 aligned with those in abutting strips and shown located on a longitudinal center line of the strip with these slots spaced apart to receive the teeth of a sprocket drive wheel or gear 17 housed in the base 11. The upper or outer ends of the laminated standards are located in deep slots 18 in the rigid platform 13 along the edges 19, 20, and thus provide a rigid assembly with the supported platform.

The base 11 of the lifting device is shown rectangular in shape composed of a bottom wall 21, side walls 22, 23 and a top wall 24 providing an enclosure. The drive mechanism for the plural standards, there being shown three on two opposed sides with the convex surfaces facing inwardly, is housed within this box-like structure. Sprocket wheels or gears 17, one for each strip, are keyed or mounted on two longitudinal shafts 25 with these shafts arranged in spaced but parallel relation at the sides 22 of the base. Also attached or keyed to each shaft 25 is a worm wheel 26 meshing with and driven by a transverse shaft 27 through worms 28 and 29 at the opposite ends of the shaft 27. Worm 28 is a right-hand gear and worm 29 is a left-hand gear. At the center of the transverse shaft 27 is attached or keyed a worm wheel 31 which when rotated drives worms 28, 29 and the longitudinal shafts 25 and their sprocket wheels 26. A worm 32 keyed to a longitudinally extending and centrally arranged shaft 33 drives the worm wheel 31 to rotate the shaft 27 and its driven shafts 25 to cause the sprocket wheels or gears 17 to operate all the standards 12 simultaneously to thereby raise or lower the platform 13. A reversible drive motor 34 operates to rotate the shaft 33.

Also within the base 11 are vertically disposed guides 35 for conformably receiving the standards 12 and storage members 36 in which reserve lengths of the standards within the base are coiled when not in use. The base 11 is relatively deep to house the drive mechanism, and the guides 35 therein provide an effective support for the lower vertically disposed ends of the upright standards between the sprocket wheels 17 and the top of the base 24. The guides 35 are shaped to closely conform to the transverse curvature of the standards and thus increase the rigidity and stability of said standards. Each storage member 36 preferably consists of a drum with a slot 37 through which the retracted laminated standard is fed and coiled within but from which it may be readily withdrawn when the standard is being extended.

To illustrate the relative depths of the base 11 and platform 13, the following illustrative example is given but is not intended as limiting the present invention as the relative dimensions may be altered to effect the lifting force required. The base is approximately 6 feet long and approximately 3½ feet wide. The depth of the base is approximately 2 feet. The platform has an approximate length of 5½ feet and an approximate width of 3 feet. The depth of the platform is approximately ½ foot. Each standard is approximately one foot wide with the length, thickness and number of laminations in the standards depending on the height desired for raising the platform and the weight to be carried.

A second embodiment of the present invention is disclosed in FIGS. 3 and 4. In this embodiment, three laminated standards 12ª are provided to form a substantially triangular tubular support 40 for supporting and raising and lowering the platform 13ª. Again the driving or operating mechanism therefor is housed in a base 11ª. The metal strips 41 forming the laminated standards 12ª are provided with locking means to join the extended, adjoining edges of the standards 12ª for providing a rigid tubular support for raising and lowering the platform. The metal strips or laminations 41 are of concavo-convex shape having a transverse concave curve with the curve facing outwardly from the tubular support. These strips like those in the embodiment of FIGS. 1 and 2 are provided with uniformly spaced transverse slots 42 located on a longitudinal center line of each strip. Further, each strip is provided with uniformly spaced slots 43 along each edge as more clearly shown in FIG. 8. Each slot is contoured to provide a circular recess 44 with a restricted outer entrance opening 45 having outwardly tapered sides to guide the locking means as hereinafter disclosed. The strips can be riveted together at the top of the tubular support with rivets 46 as shown in FIG. 6.

Each standard 12ª is shown housed in a storage drum 47 supported on the base 11ª. Each storage drum 47 has a spiral passageway 48 formed by spiral wall 49 to guide the standard into a coiled relationship when retracted from use.

The drive mechanism for this embodiment is supported in the base 11ª and is so constructed as to feed the plural standards simultaneously, thus raising or lowering the platform 13ª. This operating mechanism includes an upright worm 51 extending from within the base 11ª through a bushing 52 mounted on the top of the base and up into the tubular support 40 formed by the laminated metal standards 12ª. The teeth of the worm 51 engage the transverse slots 42 and upon rotation of the worm drives all the standards 12ª simultaneously. Within the base 11ª, the lower end of the shaft 53 of the worm 51 has keyed thereto a worm wheel 54 in meshing engagement and driven by a worm 55 mounted on the shaft 56 of a reversing drive motor 57. Obviously, speed reducer gearing may be provided for operating between the shaft 53 and its worm 51.

The locking means for the edges of the standards 12ª is more clearly shown in FIGS. 6, 7 and 8. As shown in FIGS. 3 and 4, the unextended locking means are stored in storage drums 58 which may be similar to the storage drums 47. The locking means comprises chains 59 with each length consisting of individual links as shown in FIG. 7. Each link has a pin 61 and a pair of spaced linking members 62. The pin 61 is rigid in the top holes 63 in the linking members. Holes 64 at the bottom of the linking members 62 are larger in area so that a connecting pin 61 pivots therein. Each pin 61 has parallel flat surfaces 61ª which are also parallel to the plane of the chain. The chains are preferably fastened to the edges of adjoining standards adjacent the top of the support and the members 62 are spaced apart sufficiently to straddle the edges of the standards. The pins 61 are so arranged that they enter the opening 45 of the slots 43 when the flat sides 61ª of the pins are perpendicular to the axial plane of the support 40 formed by the standards 12ª, and when the pin is rotated within the circular recess 44, the width of the diameter of the pin exceeds the width of opening 45 thus locking the pin in position within the recess.

FIG. 6 discloses diagrammatically the operation of the locking means. A sprocket wheel 65 feeds the chain 59 to adjacent the moving standards. The chain is fed thereto in a substantially horizontal plane with the flat surfaces 61ª on the pins 61 also horizontal. Each pin 61 is then guided into the restricted opening 45 and into the recess 44 of the slot 43, and then as the chain is moved upward the pin will rotate to a position in which its flat sides 61ª are vertically disposed in the recess 44 locking the pin in place. The pin 61 on rotation will rotate its depending link. However, since the holes 64 of the spaced links are larger than the holes 63, the following pin 61 will not be affected by the movement of the previous link. When the support is retracted, the reverse operation takes place.

Referring to FIGS. 9 and 10, an alternate form of locking means integral with the metal strips 41ª forming the standard 12ᵇ is shown. Along the edges of each standard are rows of alternate but aligned openings 71 and lugs 72 adapted to be conformably received in the openings. These holes and lugs are so arranged on adjacent edges of the standards that a lug 72 on one standard will engage and enter an opening 71 on an adjacent standard as these standards are elevated. Thus the three standards are locked together by interlocking interengagement of complementary lugs and holes as they are moved vertically. Upon retraction of these standards at the point where they separate and move outwardly away from the vertical, the lugs 72 automatically withdraw from their aligned openings 71.

While the drums 47 for receiving the separated standards and the drums 58 for receiving the chains are shown disposed above and to the exterior of the bass 11ᵃ, the depth of the latter may be increased to accommodate these drums.

Having described several embodiments of my invention, it will be apparent that various changes may be made in the details of construction without departing from the spirit or scope of the invention. Other arrangements of the tubular support using different numbers of metal strips or laminations will fall within the purview of my invention, the invention being entitled to all equivalents and changes inherent in the structure described and the claims which follow.

Having thus disclosed the invention, I claim:

1. A lifting device comprising a hollow base, a rigid platform spaced above said base, a plurality of lifting standards having their upper ends secured to and inserted into and carrying said rigid platform, said standards each consisting of multiple elongated curved metal strips in abutting relation to form a laminar structure with said strips being transversely curved and having longitudinally spaced transverse slots centrally located in each said strip with the slots in abutting strips in alignment, storage drums for housing the retracted portion of each standard, drive mechanism for simultaneously elevating or lowering said standards and the attached platform including drive means having teeth received in said transverse slots, and a common reversible drive motor for simultaneously actuating said drive means, the laminated standards being of concavo-convex shape and arranged relative to each other to resist buckling of any one or more standards.

2. A lifting device as set forth in claim 1 in which said drive means includes a sprocket wheel for engaging and moving each said standard, shafts on which the sprocket wheels are securely mounted, and a worm gear engaging said shafts for rotating said sprocket wheels simultaneously with said reversible motor driving said worm gear.

3. A lifting device as set forth in claim 1 in which the standards are positioned along two parallel sides of the base.

4. A lifting device as set forth in claim 3 in which the base is provided with guide slots conformably receiving and guiding movement of said standards and the platform is provided with slots for conformably receiving the upper end of said standards, said guide slots and platform slots being relatively deep in a vertical plane to provide stability and rigidity in said standards.

5. A lifting tool comprising a hollow base, a rigid platform spaced above said base, standards combining to form a substantially triangular tubular support for said platform, means for interlocking engagement of the edges of said standards, a worm extending vertically upward from said base into the tubular column, said standards having transverse slots spaced longitudinally thereof and engaged by the worm whereby upon rotation of the worm the standards are extended or retracted, and a reversible drive motor in said hollow base for rotating said worm.

6. A lifting tool as set forth in claim 5 in which each standard is of concavo-convex shape and consists of plural metal laminations.

7. A lifting device comprising a hollow base, a rigid platform spaced above said base, standards forming a substantially triangular tubular support for said platform, locking means for engaging and retaining the abutting edges of said standards, said standards comprising laminated metal strips having transverse concave curves, transverse elongated and longitudinally spaced slots in each strip intermediate its edges, a worm extending vertically upward from said base into said tubular column, said worm engaging said transverse slots for moving said standards longitudinally, storage means to receive said standards when in retracted position, a spiral passageway in each said storage means in which the standard slides, and a reversible drive motor mounted in said hollow base and operatively connected to said vertical worm for rotating the latter.

8. A lifting device as set forth in claim 7 in which slots are formed in the edges of each standard, each slot including a restricted opening at the edge of the standard and an enlarged circular recess spaced from said edge of the standard and communicating with said restricted opening, locking chains for interlocking engagement with adjacent edges of adjoining standards, said locking chains having pivot pins with flattened surfaces on two sides entering the slots in the adjacent edges of adjoining standards and then on moving upward with the tubular support pivot whereby to lock the pins in the slots.

9. A lifting device as set forth in claim 8 in which sprocket wheels guide the locking chains into engagement with the standards, and means for storing the locking chains when retracted.

References Cited in the file of this patent

UNITED STATES PATENTS

| | | |
|---|---|---|
| 2,130,993 | Dubilier | Sept. 20, 1938 |
| 2,661,082 | Ziegler | Dec. 1, 1953 |
| 2,799,368 | Alter | July 16, 1957 |

FOREIGN PATENTS

| | | |
|---|---|---|
| 20,059 | Norway | July 12, 1909 |